United States Patent
Kamen et al.

(10) Patent No.: US 7,770,152 B1
(45) Date of Patent: Aug. 3, 2010

(54) METHOD AND APPARATUS FOR COORDINATING STATE AND EXECUTION CONTEXT OF INTERPRETED LANGUAGES

(75) Inventors: Yury Kamen, Menlo Park, CA (US); Deepak Alur, Fremont, CA (US); Syed M. Ali, Menlo Park, CA (US); John P. Crupi, Bethesda, MD (US); Daniel B. Malks, Arlington, VA (US)

(73) Assignee: Oracle America, Inc., Redwood Shores, CA (US)

( * ) Notice: Subject to any disclaimer, the term of this patent is extended or adjusted under 35 U.S.C. 154(b) by 1212 days.

(21) Appl. No.: 11/133,832

(22) Filed: May 20, 2005

(51) Int. Cl.
*G06F 9/44* (2006.01)
*G06F 9/45* (2006.01)
(52) U.S. Cl. .................. 717/127; 717/138; 717/139
(58) Field of Classification Search ........ 717/114, 717/124–125, 127–139
See application file for complete search history.

(56) References Cited

U.S. PATENT DOCUMENTS

| | | | | |
|---|---|---|---|---|
| 5,764,989 A * | 6/1998 | Gustafsson et al. | ......... | 717/129 |
| 5,802,373 A * | 9/1998 | Yates et al. | ......... | 717/139 |
| 5,842,017 A * | 11/1998 | Hookway et al. | ......... | 717/158 |
| 5,875,335 A * | 2/1999 | Beard | ......... | 717/139 |
| 6,091,897 A * | 7/2000 | Yates et al. | ......... | 717/138 |
| 6,105,072 A * | 8/2000 | Fischer | ......... | 719/315 |
| 6,202,202 B1 * | 3/2001 | Steensgaard | ......... | 717/127 |
| 6,463,582 B1 * | 10/2002 | Lethin et al. | ......... | 717/158 |
| 6,772,413 B2 * | 8/2004 | Kuznetsov | ......... | 717/136 |
| 6,813,762 B1 * | 11/2004 | Plaxton | ......... | 717/148 |
| 6,907,599 B1 * | 6/2005 | Kashai et al. | ......... | 717/137 |
| 6,954,923 B1 * | 10/2005 | Yates et al. | ......... | 717/130 |
| 6,957,422 B2 * | 10/2005 | Hunt | ......... | 717/130 |
| 6,973,644 B2 * | 12/2005 | Nylander et al. | ......... | 717/139 |
| 7,055,142 B2 * | 5/2006 | Meredith et al. | ......... | 717/136 |
| 7,069,543 B2 * | 6/2006 | Boucher | ......... | 717/127 |
| 7,089,539 B2 * | 8/2006 | Dornan et al. | ......... | 717/139 |
| 7,444,619 B2 * | 10/2008 | McManus | ......... | 717/114 |
| 7,516,446 B2 * | 4/2009 | Choi et al. | ......... | 717/128 |
| 7,536,682 B2 * | 5/2009 | Dankel et al. | ......... | 717/139 |

OTHER PUBLICATIONS

Kiselyov et al, "Delimited dynamic binding", ACM ICFP, pp. 26-37, 2006.*
Power, "A unified category theoretic approach to variable binding", ACM, pp. 1-9, 2003.*
Kotzmann et al, "Run time support for optimizations based on escape analysis", IEEE CGO, pp. 49-60, 2007.*
Gulwani et al, "Lifting abstract interpreters to quantified logical domains", ACM POPL, pp. 235-246, 2008.*
Barton et al, "Shared memory programming for large scale machines", ACM PLDI, pp. 108-117, 2006.*
Harris et al, "Lightweight object oriented shared variables for distributed applications on the internet", ACM OOPSLA, pp. 296-309, 1998.*

(Continued)

*Primary Examiner*—Anil Khatri
(74) *Attorney, Agent, or Firm*—Osha • Liang LLP (57) ABSTRACT

A system that includes a shared variable scope configured to store at least one shared variable binding, a first interpreter configured to search the shared variable scope to determine a variable binding for a variable, and a second interpreter configured to search the shared variable scope to determine the variable binding for the variable.

7 Claims, 5 Drawing Sheets

OTHER PUBLICATIONS

Corbett, "Using shape analysis to reduce finite state models on concurrent Java programs", ACM Trans. on Software Eng. and Methodology, vol. 9, No. 1, pp. 51-93, 2000.*

Prof. Victor V. Martynov, EHU; "SEMPL Semantic Patterns Language"; Summary Chapter from the book "Foundations of Semantic Coding", pp. 128-138, EHU, 2001 (9 pages).

Kamran Sartipi; "Software Architecture Recovery Based on Pattern Matching"; School of Computer Science, University of Waterloo; Proceedings of the International Conference on Software Maintenance (ICSM'03); IEEE Computer Society (4 pages).

Aldrich, et al; "Architectural Reasoning in ArchJava"; Department of Computer Science and Engineering; University of Washington; 2002; pp. 1-34.

"Structural Analysis for Java"; Mar. 1, 2004 (2 pages).

Lovatt, et al.; "A Pattern Enforcing Compiler (PEC) for Java: Using the Compiler"; Department of Computing, Macquarie University; 2005 Australian Computer Society, Inc.; (10 pages).

Hallem, et al.; "Uprooting Software Defects at the Source"; Instant Messaging, vol. 1, No. 8, Nov. 2003; pp. 1-9.

"CAST Application Intelligence Platform Empowering Application Management"; CAST the Application Intelligence Company; Oct. 2004; (2 pages).

Agitar Data Sheet; "Agitator & Management Dashboard"; Agitar Software 2003-2005; (4 pages).

Carriere et al.; "Assessing Design Quality From a Software Architectural Perspective"; OOPSLA '97 Workshop on Object-Oriented Design Quality; Oct. 5, 1997 (4 pages).

Hassan et al.; "Architecture Recovery of Web Applications"; The Guide to Computing Literature; International Conference on Software Engineering; 2002; (12 pages).

Ellsworth et al; "JUnit+Jtest=Automated Test Case Design and Static Analysis"; May 9, 2003 (3 pages).

"J2EE Code Validation Preview for WebSphere Studio"; Mar. 21, 2005 (3 pages).

"SQL Compiler (for Java) Free your Java code from SQL statements-compile them to Java classes"; May 1, 2005 (9 pages).

* cited by examiner

METHOD AND APPARATUS FOR COORDINATING STATE AND EXECUTION CONTEXT OF INTERPRETED LANGUAGES

BACKGROUND

An interpreter corresponds to a program that executes other programs. In contrast, a compiler does not execute its input program (i.e., the "source code"); rather, the compiler translates the input program into executable "machine code" (also known as "object code") that is subsequently output to a file for later execution. In some instances, it may be possible to execute a particular piece of source code either directly by an interpreter or by compiling it and then executing the resulting machine code. A program executed using an interpreter is typically slower than a program executed using machine code. The difference in execution performance is directly related to the operation of the interpreter. Specifically, the interpreter analyzes each statement that is encountered and performs the action(s) specified in the statement.

With respect to analyzing each statement in the program, the interpreter must determine what each expression and variable within the statement means in order to determine what action to perform. If the statement includes a variable, then the interpreter must determine the value associated with the variable. Said another way, the interpreter must determine the value bound to the variable. The binding of a variable to a value is commonly referred to as "variable assignment." Because the program may include a number of variables with the same name, the interpreter typically uses a scoping rule to determine the specific variable being referred to in the statement it is interpreting. Each variable in the program is associated with the scope that defines the portion of the program in which the particular variable may be accessed by name.

The scoping rules allow the interpreter to unambiguously select the appropriate variable (assuming that there are multiple variables with the same name) at any point in the execution of the program. There are two general scoping rule paradigms: (i) lexical scoping rules and (ii) dynamic scoping rules. In general, the lexical scoping rules limit the scope of a particular variable to the portion of the source code in which the variable was initially declared. In contrast, dynamic scoping rules define the scope of the particular variable based on the nesting of procedure and function calls at runtime.

Regardless of the implementation of the scoping rules of a given interpreter, the interpreter only applies the scoping rules to the variable bindings defined by the interpreter. Thus, if a given application involves a communication between a first interpreter and a second interpreter (i.e., a first interpreter calls a second interpreter), then each interpreter will maintain its own variable bindings and these variable bindings will not be accessible to the other interpreter. Thus, a variable defined by one of the interpreters is not understood by the second interpreter because the variable binding is outside the scope of the second interpreter.

Accordingly, when a first interpreter issues a call to a second interpreter, the second interpreter executes the call and sends the resulting data back to the first interpreter. If the first interpreter wants the second interpreter to further process the resulting data, then the first interpreter sends the resulting data (i.e., the data just received from the second interpreter) back to the second interpreter for processing. In order to send the resulting data from the second interpreter to the first interpreter (and vise versa), the resulting data must typically be serialized (and subsequently de-serialized when it arrives at its destination). Because each interpreter maintains its own variable bindings, a variable binding for the resulting data (i.e., a variable assignment that is bound to the resulting data) must be maintained by both the first interpreter and the second interpreter.

SUMMARY

In general, in one aspect, the invention relates to a system comprising a shared variable scope configured to store at least one shared variable binding, a first interpreter configured to search the shared variable scope to determine a variable binding for a variable, and a second interpreter configured to search the shared variable scope to determine the variable binding for the variable.

In general, in one aspect, the invention relates to a method for using a shared variable, comprising determining whether a variable binding associated with the variable is defined in a shared variable scope, if the variable binding is defined in the shared variable scope: generating a first value accessor associated with the variable, and obtaining the value of the variable using the first value accessor.

In general, in one aspect, the invention relates to a computer readable medium comprising software instructions for using a shared variable, comprising software instructions to determine whether a variable binding associated with a variable is defined in a shared variable scope, generate a first value accessor associated with the variable, if the variable binding is defined in the shared variable scope, and obtain the value of the variable using the first value accessor, if the variable binding is defined in the shared variable scope.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In the exemplary embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for sharing variables between two or more interpreters. More specifically, embodiments of the invention provide a method and apparatus for creating a shared variable scope and then providing each interpreter with access to the shared variable scope. Further, the interpreters include functionality to search the shared variable scope to determine the variable bindings of variables encountered during the execution of a program. In one or more embodiments of the invention, the provision of a shared variable scope enables two interpreters to use the same variable binding (i.e., call the same variable). Thus, data referred to by the variables does not need to be passed between the two interpreters as the two interpreters have access to the data by virtue of the fact that the data is associated with the shared variable. Further, changes made by one interpreter to the shared variable are readily accessible to the second interpreter (i.e., subsequent calls that include the shared variable will use the modified value bound to the shared variable).

Figure 1:
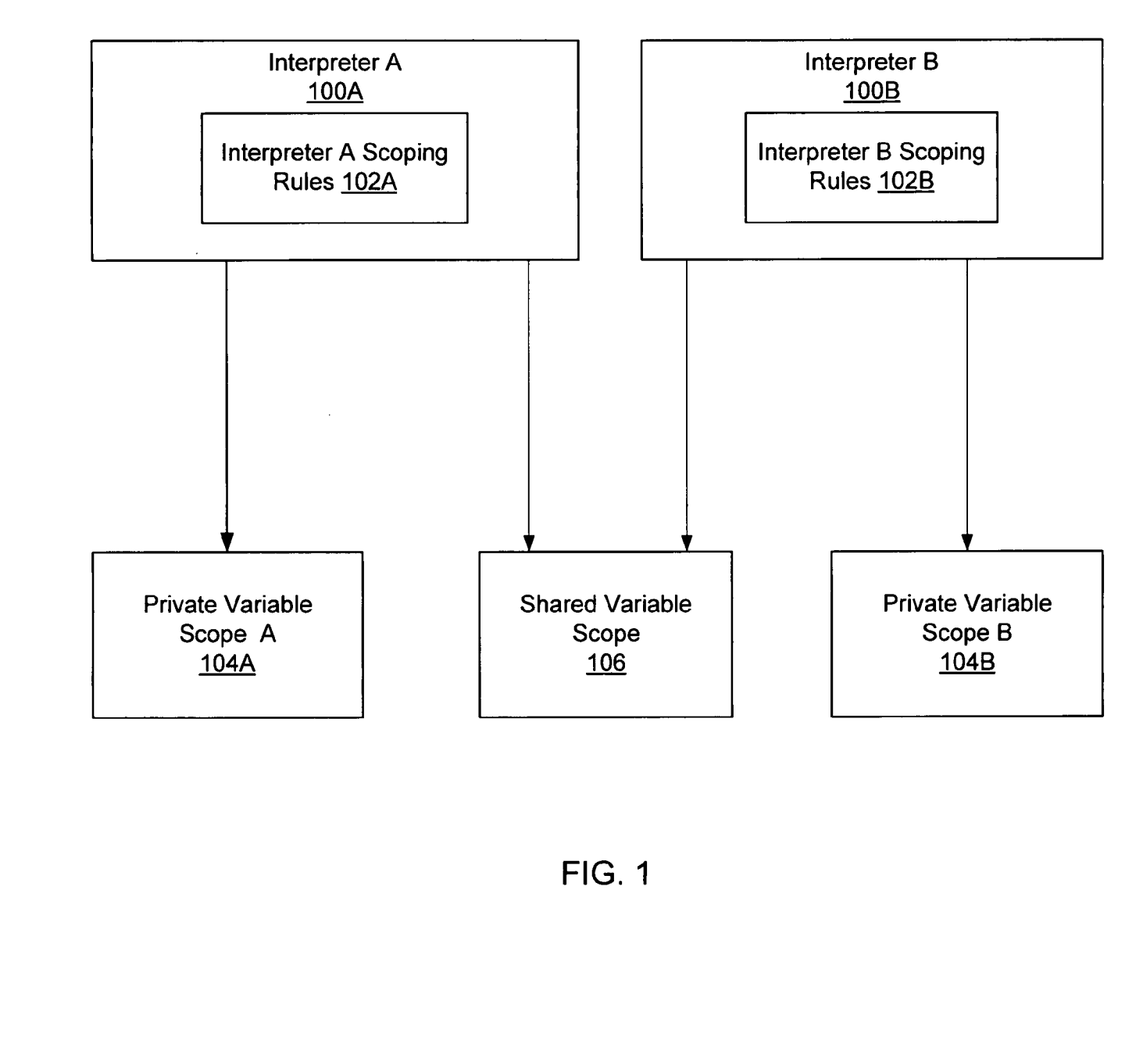
FIG. 1 shows a system in accordance with one embodiment of the invention.

FIG. 1 shows a system in accordance with one embodiment of the invention. As shown in FIG. 1, the system includes two interpreters (Interpreter A (100A), Interpreter B (100B)). Further, each interpreter (100A, 100B) is associated with a private variable scope as well as a shared variable scope (106). More specifically, Interpreter A (100A) is associated with private variable scope A (104A) and Interpreter B (100B) is associated with private variable scope B (104B). Further, both interpreter A (100A) and interpreter B (100B) are associated with the shared variable scope (106).

In one embodiment of the invention, each variable scope (104A, 104B, 106) includes one or more variable bindings. In one embodiment of the invention, a variable binding associates a variable name with a value. The variable bindings included in private variable scope A (104A) are the variable bindings created, maintained, and used by interpreter A (100A) and are not accessible by interpreter B (104B). Similarly, the variable bindings included in private variable scope B (104B) are the variable bindings created, maintained, and used by interpreter B (100B) and are not accessible by interpreter A (104A). In contrast to the private variable scopes of interpreter A and Interpreter B (104A, 104B), the shared variable scope (106) is accessible by both interpreters (100A, 100B). Further, each interpreter (100A, 100B) may create, use, and maintain shared variable bindings in the shared variable scope (106).

Those skilled in the art will appreciate that an interpreter (100A, 100B) may include more than one private variable scope. Further, those skilled in the art will appreciate that the private variable scope (104A, 104B) for a given interpreter (100A, 100B) may correspond to a location (or locations) that the interpreter searches to determine variable bindings (i.e., variable name—variable value pairs). Further, the shared variable scope (106) also corresponds to a location (or locations) that one or more interpreters search to determine variable bindings.

As shown in FIG. 1, each interpreter (100A, 100B) may search for variable bindings in either their own private variable scope (104A, 104B) or in the shared variable scope (106). The order in which the various variable scopes (104A, 104B, 106) are searched by a given interpreter (100A, 100B) is determined by the scoping rules (102A, 102B) associated with the particular interpreter (100A, 100B). In one embodiment of the invention, the scoping rules (102A, 102B) instruct the interpreter (100A, 100B) to first search the private variable scope (104A, 104B) associated with the interpreter (100A, 100B) and if the variable binding is not found in the private variable scope (104A, 104B), then to search the shared variable scope (106). Alternatively, the scoping rules (102A, 102B) may instruct the interpreter (100A, 100B) to first search the shared variable scope (106) and, if the variable binding is not found in the shared variable scope (106), then to search the private variable scope (104A, 104B) associated with the interpreter (100A, 100B).

If the interpreter (100A, 100B) is associated with more than one private variable scope (104A, 104B), then the scoping rules associated with the interpreter (100A, 100B) may instruct the interpreter (100A, 100B) to search all the private variable scopes (104A, 104B) associated with the interpreter (100A, 100B), and then to search the shared variable scope (106). Alternatively, the scoping rules associated with the interpreter (100A, 100B) may instruct the interpreter (100A, 100B) to search the shared variable scope (106) and then to search all the private variable scopes (104A, 104B) associated with the interpreter (100A, 100B). Further, the scoping rules may instruct the interpreter (100A, 100B) to search a certain number of private variable scopes, then search the shared variable scope (106), and then finish searching the remaining private variable scopes associated with the interpreter (100A, 100B). In one embodiment of the invention, the availability of the shared variable scope (106) may be enabled and/or disabled during specific portions of the execution of a program.

Figure 2:
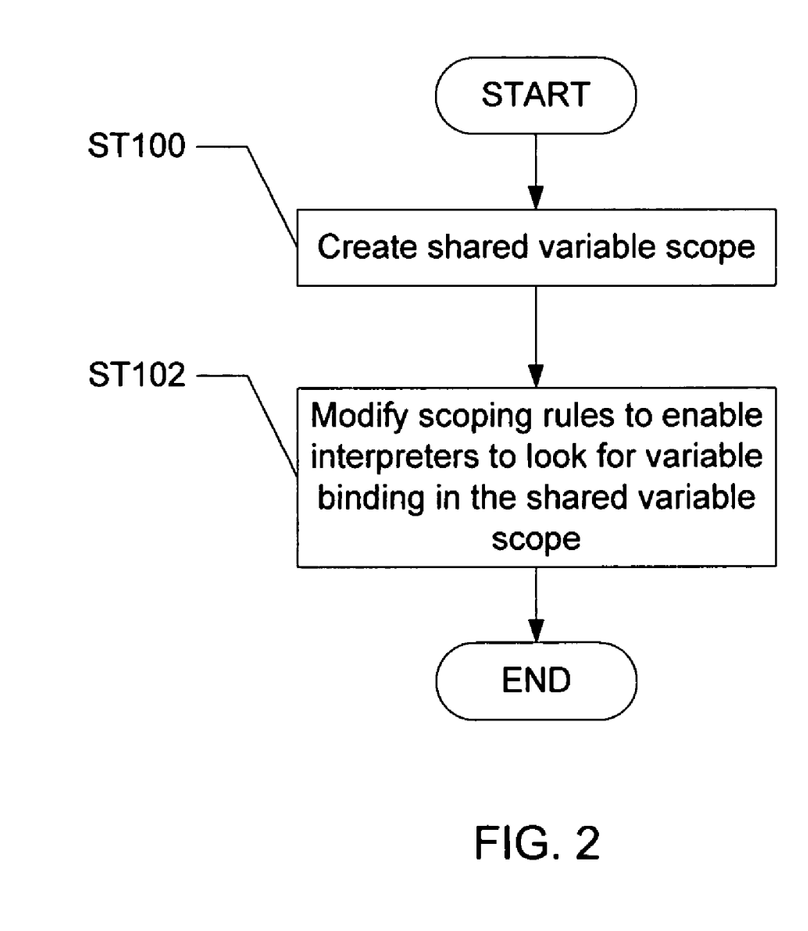
FIGS. 2-4 show flowcharts in accordance with one embodiment of the invention.

FIG. 2 shows a flowchart in accordance with one embodiment of the invention. More specifically, FIG. 2 shows a method for setting up a system to use a shared variable scope. Initially, the shared variable scope is created (ST100). As discussed above, the shared variable scope corresponds to a location (or locations) that include variable bindings. Thus, creating a shared variable scope may include creating the necessary data structures used to store variable bindings. Once the variable scope has been created, the scoping rules associated with the interpreters that may access the shared variable scope are modified to instruct the interpreters to search the shared scope for variable bindings (ST102). Embodiments of the various modifications to the scoping rules to include instructions for the interpreter to search the shared variable scope are discussed above.

In one embodiment of the invention, the scoping rules for a given interpreter may be modified by modifying the interpreter executable code using a machine code transformation, a byte code transformation, library interposition during program linking, etc.

Figure 3:
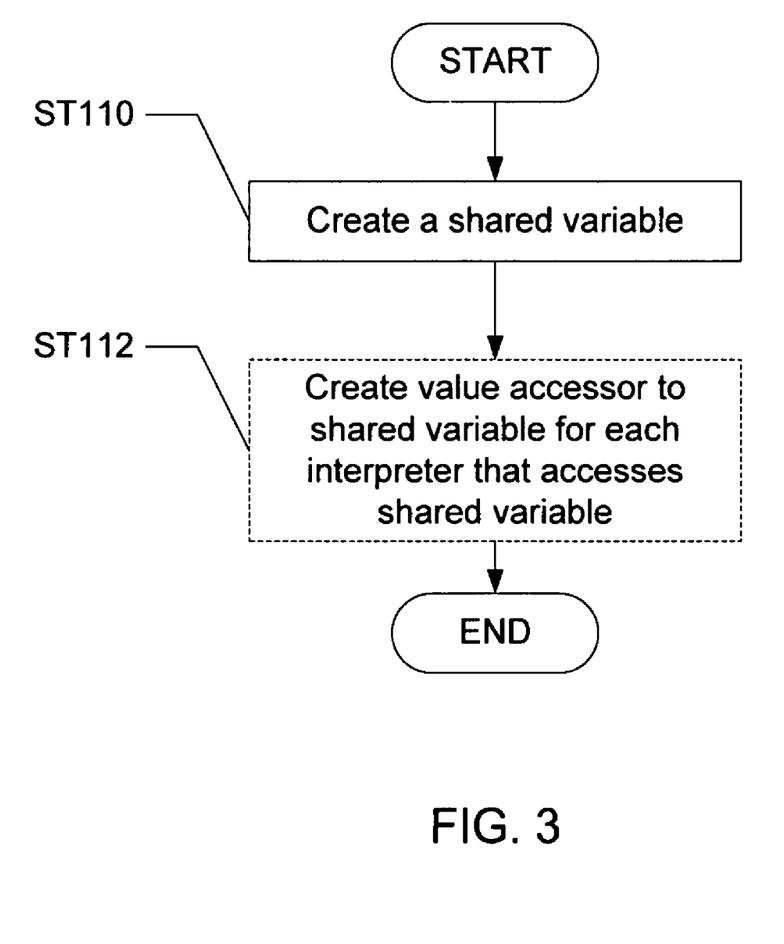

At this stage, the system is ready to allow two or more interpreters to use shared variables. FIG. 3 shows a flowchart in accordance with one embodiment of the invention. More specifically, FIG. 3 shows a method for creating a shared variable in accordance with one embodiment of the invention. Initially, a shared variable is created (ST110). In one embodiment of the invention, creating a shared variable includes allocating the variable and binding the variable to a variable name. In one embodiment of the invention, the variable binding associated with the shared variable is stored within the shared variable scope.

Alternatively, in one embodiment of the invention, an interpreter creates a shared variable by allocating the variable, binding the variable to a name, and then storing the variable binding in a private variable scope associated with the interpreter. The interpreter then creates and stores an alias (e.g., a pointer, a reference, etc.) to the variable binding (i.e., the variable binding residing in the private variable scope) in the shared variable scope. Thus, all attempts to access the shared variable from the shared variable scope will be directed to the private variable scope of the interpreter. While other interpreters are typically unable to access a private variable scope of another interpreter, in the aforementioned embodiment an interpreter is able to access a variable binding of a shared variable that resides in the private variable scope of another interpreter.

Once the shared variable has been created, a value accessor to the shared variable may be created for each interpreter that accesses the shared variable (ST112). The value accessor allows an interpreter to access the value of the shared variable in a format that is native to the interpreter (i.e., in a format understood by the interpreter).

Figure 4:
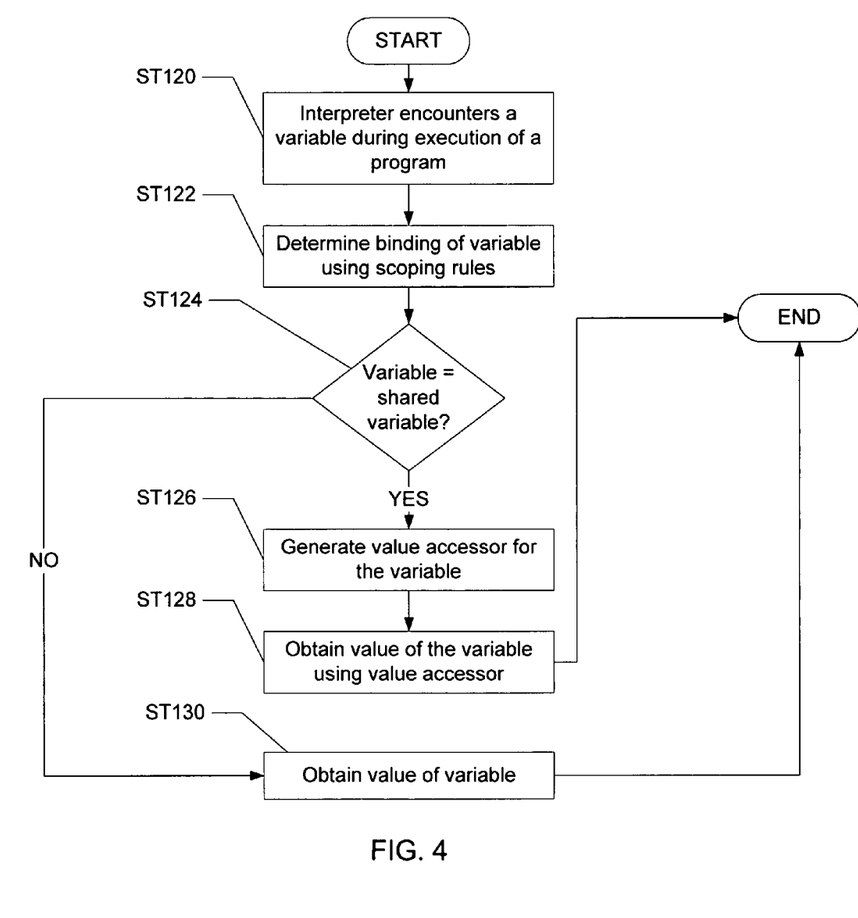

FIG. 4 shows a flowchart in accordance with one embodiment of the invention. More specifically, FIG. 4 shows a method for using a shared variable in accordance with one embodiment of the invention. Initially, the interpreter encounters a variable during the execution of a program (ST120). The interpreter subsequently uses scoping rules associated with the interpreter to determine the binding (i.e., value) of the variable (ST122). If the variable is a shared variable (i.e., the variable binding for the variable was found in the shared variable scope) (ST124), then a value accessor for the variable is generated (or in some cases obtained) (ST126). The value accessor is subsequently used to obtain the value of the variable (ST128). Alternatively, if the variable is not a shared variable (i.e., the variable binding is found within the private variable scope associated with the interpreter), then the value of the variable is obtained without the use of a value accessor (ST130).

The following is an example of an embodiment of the invention. In this example, a first interpreted language is creating and assigning a number of shared variables and then issuing a query to the second interpreter. The source for the example is as follows:

Example Source Code

```
1   pql = new PQL(this);
2   param = 'java.util.%';
3   x = pql.query("SELECT c.name FROM classes c WHERE
        c.name = param");
```

In line 1, a PQL object is created. In line 2, a shared variable is created. Finally, in line 3, a variable ("x") is assigned to the request of executing the query specified within the PQL object. In this example, the query is to be executed by a second interpreter (i.e., a PQL interpreter). When the query in line 3 is issued to the PQL interpreter, the PQL interpreter is able to find the variable binding for "param" from the shared variable scope. Thus, the PQL interpreter will issue the following query "SELECT c.name FROM classes c WHERE c.name=java.util.%." Thus, the variable bindings specified by the first interpreter may be used by the second interpreter, namely, the PQL interpreter.

Figure 5:
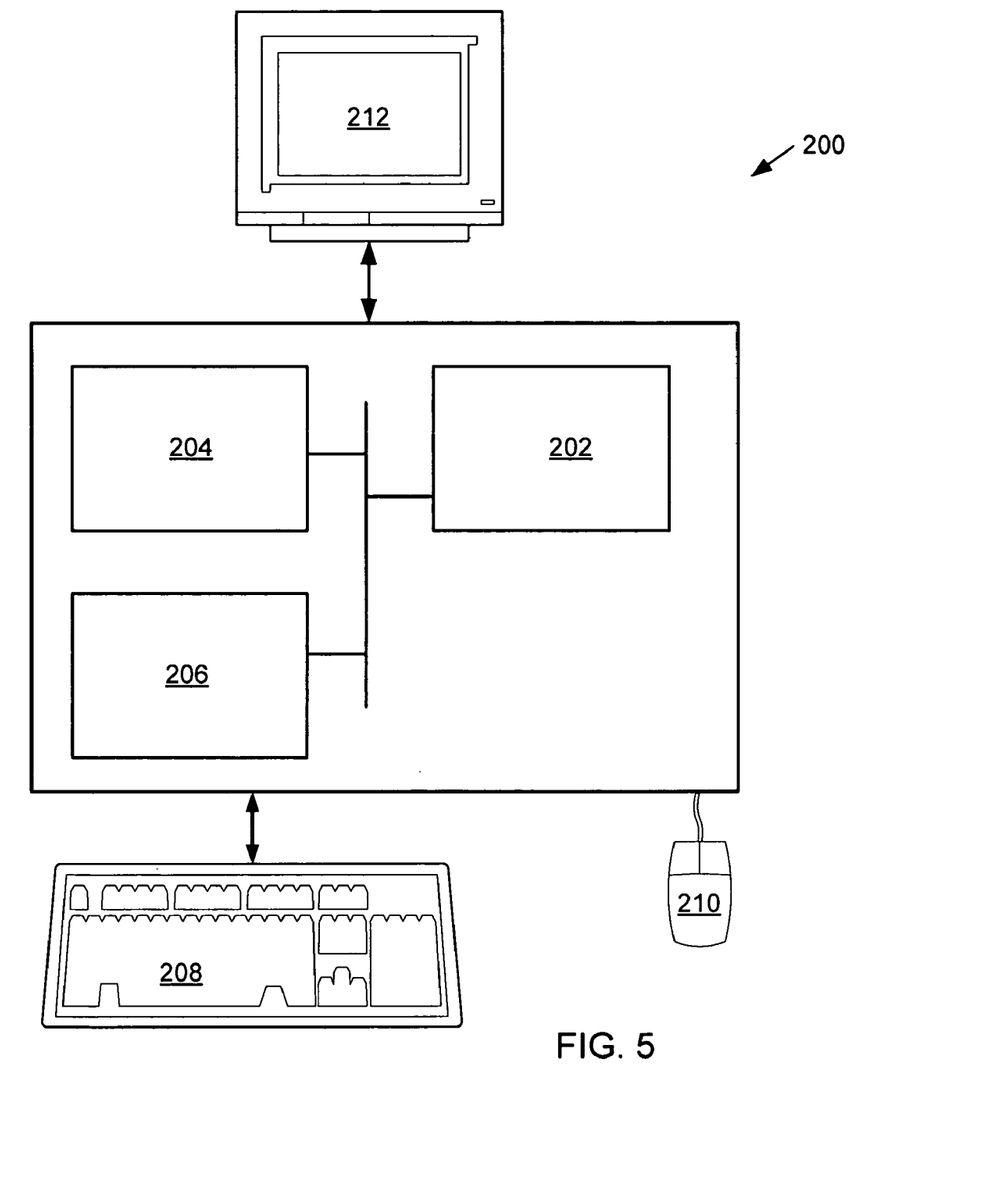
FIG. 5 shows a computer system in accordance with one embodiment of the invention.

An embodiment of the invention may be implemented on virtually any type of computer regardless of the platform being used. For example, as shown in FIG. 5, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a memory configured to store a shared variable scope accessible by a plurality of interpreters, wherein the shared variable scope comprises an alias associated with a variable, wherein the alias is a reference to a variable binding for the variable in a first private scope associated with a first interpreter of the plurality of interpreters;
   a processor configured to execute:
      the first interpreter configured to directly execute first source code of a first interpreted language and configured to use the alias to access the variable binding for the variable during the direct execution of the first source code; and
      a second interpreter of the plurality of interpreters configured to directly execute second source code of a second interpreted language and configured to use the alias in the shared variable scope to access the variable binding for the variable during the direct execution of the second source code; and modifying a scoping rule associated with the first interpreter such that the first interpreter searches the shared variable scope for the variable binding before searching for the variable binding in the private variable scope associated with the first interpreter.

2. The system of claim 1, the memory further storing:
   a second private variable scope associated with the second interpreter configured to store at least one private variable binding for the second interpreter.

3. The system of claim 2, wherein prior to modifying the scoping rule associated with the first interpreter, is configured to initially search for the variable binding in the first private variable scope, and to search the shared variable scope for the variable binding, if the variable binding is not in the first private variable scope.

4. The system of claim 1, wherein the first interpreter generates a value accessor to obtain a value of the variable defined by the variable binding, if the alias is in the shared variable scope, wherein the value obtained by the value accessor is in a format native to the first interpreter.

5. The system of claim 1, wherein the first interpreter is configured to issue a call to the second interpreter, wherein the call includes the variable.

6. A method for using a variable, comprising:
   creating the variable;
   creating a variable binding for the variable in a private variable scope associated with a first interpreter of a plurality of interpreters, wherein the first interpreter is configured to directly execute first source code of a first interpreted language;
   placing an alias associated with the variable in a shared variable scope, wherein the alias references the variable binding for the variable in the private variable scope;
   determining whether the alias associated with the variable is stored in the shared variable scope stored in a memory, the shared variable scope accessible by the plurality of interpreters;
   if the alias is stored in the shared variable scope:
      using the alias to generate, using a processor, a first value accessor associated with the variable for a second interpreter of the plurality of interpreters, wherein the second interpreter is configured to directly execute second source code of a second interpreted language;
      obtaining, using the processor, a value of the variable from the first interpreter using the first value accessor; and storing the value of the variable in the memory; and
modifying a scoping rule associated with the first interpreter such that the first interpreter searches the shared variable scope for the variable binding before searching for the variable binding in the private variable scope associated with the first interpreter.

7. A computer readable storage medium comprising software instructions for using a variable, the software instructions executable on a processor and comprising functionality to:

create the variable;

create a variable binding for the variable in a private variable scope associated with a first interpreter of a plurality of interpreters, wherein the first interpreter is configured to directly execute first source code of a first interpreted language;

place an alias associated with the variable in a shared variable scope, wherein the alias references the variable binding for the variable in the private variable scope;

determine whether the alias associated with a variable is stored in the shared variable scope stored in a memory, the shared variable scope accessible by the plurality of interpreters;

use, if the alias is stored in the shared variable scope, the alias to generate a first value accessor associated with the variable for a second interpreter of the plurality of interpreters, wherein the second interpreter is configured to directly execute second source code of a second interpreted language;

obtain, if the alias is stored in the shared variable scope, a value of the variable from the first interpreter using the first value accessor; and store the value of the variable in the memory; and modifying a scoping rule associated with the first interpreter such that the first interpreter searches the shared variable scope for the variable binding before searching for the variable binding in the private variable scope associated with the first interpreter.

* * * * *

UNITED STATES PATENT AND TRADEMARK OFFICE
CERTIFICATE OF CORRECTION

PATENT NO. : 7,770,152 B1
APPLICATION NO. : 11/133832
DATED : August 3, 2010
INVENTOR(S) : Yury Kamen et al.

It is certified that error appears in the above-identified patent and that said Letters Patent is hereby corrected as shown below:

In Claim 3, column 6, line 32, the line appears as "scoping rule associated with the first interpreter, is configured" and should read -- scoping rule associated with the first interpreter, the first interpreter is configured --.

Signed and Sealed this

Nineteenth Day of October, 2010

David J. Kappos
*Director of the United States Patent and Trademark Office*